(12) United States Patent
Lo et al.

(10) Patent No.: US 7,099,701 B2
(45) Date of Patent: Aug. 29, 2006

(54) ROTATING LED DISPLAY DEVICE RECEIVING DATA VIA INFRARED TRANSMISSION

(75) Inventors: Wai Kin Lo, Hong Kong (CN); Kwok Wah Sit, Hong Kong (CN)

(73) Assignee: GIANT Electronics Ltd., Hong Kong (CN)

( * ) Notice: Subject to any disclaimer, the term of this patent is extended or adjusted under 35 U.S.C. 154(b) by 257 days.

(21) Appl. No.: 10/386,073

(22) Filed: Mar. 11, 2003

(65) Prior Publication Data

US 2004/0102223 A1    May 27, 2004

Related U.S. Application Data

(60) Provisional application No. 60/429,058, filed on Nov. 25, 2002.

(51) Int. Cl.
*H04M 1/00* (2006.01)
*G09G 3/32* (2006.01)

(52) U.S. Cl. ........................ 455/566; 345/82
(58) Field of Classification Search ................... 345/82, 345/33, 39, 44, 46; 455/566, 550.1; 715/864
See application file for complete search history.

(56) References Cited

U.S. PATENT DOCUMENTS

| | | | | |
|---|---|---|---|---|
| 4,160,973 A | * | 7/1979 | Berlin, Jr. | 345/31 |
| 5,057,827 A | * | 10/1991 | Nobile et al. | 345/31 |
| 5,302,965 A | * | 4/1994 | Belcher et al. | 345/31 |
| 6,085,112 A | * | 7/2000 | Kleinschmidt et al. | 455/556.1 |
| 6,300,939 B1 | * | 10/2001 | Decker et al. | 345/157 |
| 6,775,206 B1 | * | 8/2004 | Karhu | 368/10 |
| 6,816,137 B1 | * | 11/2004 | Leja | 345/82 |

* cited by examiner

*Primary Examiner*—Bing Q. Bui
(74) *Attorney, Agent, or Firm*—Patterson & Sheridan, LLP

(57) ABSTRACT

An apparatus, system, and method for displaying and transmitting information in which a rotatable member has a display end upon which a plurality of light emitting devices (LEDs) are disposed in a linear manner normal to a plane of rotation. The invention also includes an infrared transmitter (IRT), for communicating energize instructions conforming to a message to be presented; and an infrared receiver (IRR), for receiving the energize instructions and responsively energizing specific light emitting devices such that the message is presented by the rotating light emitting devices.

15 Claims, 7 Drawing Sheets

ROTATING LED DISPLAY DEVICE RECEIVING DATA VIA INFRARED TRANSMISSION

CROSS-REFERENCE TO RELATED APPLICATIONS

This application claims benefit of U.S. provisional patent application Ser. No. 60/429,058, filed Nov. 25, 2002, which is herein incorporated by reference in its entirety.

TECHNICAL FIELD

The invention relates to the field of communication systems and, more specifically, to a method, system, and apparatus for the presentation and display of information from a communication network.

BACKGROUND OF THE INVENTION

A telecommunications service referred to as caller identification (CID) permits a called party to receive information that identifies a calling party without need for answering the call. CID information is typically displayed on a liquid crystal display (LCD) mounted to a handset, base station, or separate device. LCDs are typically planar and allow viewer perception from a substantially normal vantage point. However, the distance between the LCD and the viewer must be relatively short.

SUMMARY OF THE INVENTION

These and other deficiencies of the prior art are addressed by the present invention of a system, method, and apparatus for displaying information received from a communications network. The invention advantageously allows user perception from the three hundred and sixty (360) degree periphery of the device.

The subject invention is adapted, in one embodiment, to an apparatus for displaying and transmitting information in which a rotatable member has two opposing ends and each opposing end is substantially normal to the rotatable member. At least one of the opposing ends has a plurality of light emitting diodes (LEDs) disposed therein. An infrared transmitter (IRT) communicates energize/de-energize instructions and an infrared receiver (IRR) receives the energize/de-energize instructions. The IRR causes each LED in the plurality to energize/de-energize accordingly. The energization/de-energization of the LEDs while the rotatable member is rotating causes the perception of virtual characters.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be primarily described within the context of a caller identification (CID) display system. However, it will be appreciated by those skilled in the art that the invention may be advantageously employed in any device that sends and/or receives messages. For example, the teachings of the present invention are applicable to a wide range of messaging systems that allow writing, editing, sending and receiving of e-mail messages and short message signals (SMS). It will be appreciated by those skilled in the art that while the invention is described within the context of a CID display device, the display device discussed herein may be used to display any other information.

Figure 1:
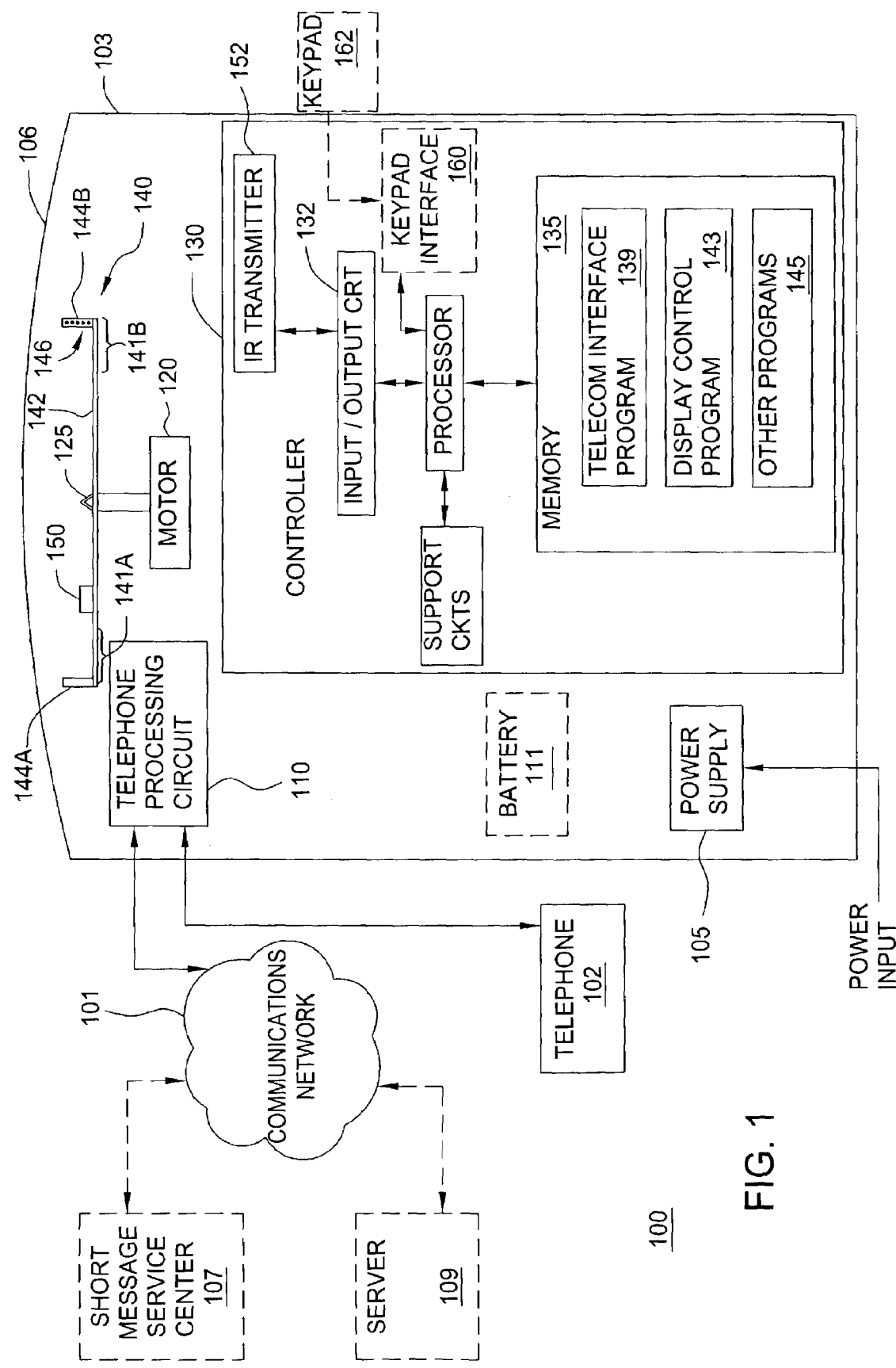
FIG. 1 depicts a high-level block diagram of an apparatus according to an embodiment of the invention.

FIG. 1 depicts a high-level block diagram of a system including the present invention. Specifically, the system 100 of FIG. 1 comprises a display device 103 that cooperates with a communications network (e.g., a public switched telephone network (PSTN)) 101 and a telephone 102 to determine and display the identification of a calling party (i.e., the display of a caller ID). The display device 103 includes a substantially translucent cover 106 and, optionally, cooperates with a keyboard 162.

The display device 103 comprises a power supply 105, a telephone processing circuit 110, a motor 120, a controller 130, a rotating display assembly 140, and an optional battery 111. The optionally battery 111 supplies power to the display device 103 when necessary.

The power supply 105 is responsive to an input power signal (illustratively a direct current (DC) input signal provided via a conventional wall transformer). The power supply 105 supplies power to the various components forming the display device 103. The telephone processing circuit 110 operates to enable telecommunications between the PSTN 101 and telephone 102. The telephone processing circuit 110 also operates to provide information to the controller 130 sufficient to enable the controller 130 to determine the identification of a calling party.

The controller 130 comprises a processor 136 as well as memory 138, for storing various programs such as, illustratively, a telecom interface program (TIP) 139, a display program (DCP) 143, an infrared (IR) transmitter 152, and, optionally, other programs (OP) 145 and a keyboard interface 160. The processor 136 cooperates with conventional support circuitry 134 such as power supplies, clock circuits, cache memory and the like, as well as circuits that assist in executing the software routines stored in the memory 138. As such, it is contemplated that some of the steps discussed herein as software processes may be implemented within hardware, for example, as circuitry that cooperates with the processor 136 to perform various steps.

The controller 130 also contains input/output (I/O) circuitry 132 that forms an interface between the various functional elements communicating with the controller 130 (e.g., the telephone processing circuit 110 and motor 120). Although the controller 130 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The TIP 139 is used to determine or otherwise process a signal (e.g., a CID associated with a party calling the telephone 102 via the PSTN 101).

The DCP 143 is used to control various aspects of the display operation of the display device 103. Such operations may include, for example, the operation of the motor 120 and the various elements within a display assembly 140.

The motor 120 is responsive to the controller 130 to rotate the display assembly 140 about a rotational rod 125. The motor 120 preferably comprises a low noise, long life, direct current brushless motor capable of extremely quiet and substantially continuous operation. The motor 120 preferably rotates the display assembly 140 at a substantially constant angular velocity.

The display assembly 140, in one embodiment, comprises a rotating member 142 (e.g., a substantially circular platter) having opposed elongated sections. Specifically, the platter 142 comprises a first elongated section 141A and a second elongated section 141B. Each of the elongated sections 141A and 141B supports a respective mounting device 144A and 144B (collectively mounting devices 144). At least one of the mounting devices 144 supports a respective array of light emitting diodes (LEDs) 146, illustratively one or more columns of seven or eight LEDs.

In an embodiment of the invention utilizing only one mounting device 144 (e.g., mounting device 144B) to support an array of LEDs 146. The first elongated section 141A and mounting device 144A are used primarily as a counter-balance to the mounting assembly 144B and array of LEDs 146 (e.g., one or more columns of LEDs). The counterbalance effect may also be provided using a much shorter first elongated section. Counterbalancing reduces stresses on the motor 120, and is not strictly required to practice the invention.

As the platter 142 rotates about the rotational rod 125, the substantially vertically disposed LEDs 146 laterally traverse a substantially translucent cover 106 formed on the display device 103. By controlling the energization and de-energization of the LEDs 146 laterally presented within the substantially translucent cover 106, the controller 130 operates to produce a viewable virtual message space. In this manner, information (e.g., CID information) is displayed using the rotating LEDs 146 such that a user can see the desired information from a greater vantage point (i.e., the 360 degree peripheral display area and distance) than afforded by the typical LCD.

In a preferred embodiment of the invention, an infrared (IR) transmitter 152 is disposed within the controller 130. The IR transmitter 152 operates to transmit, via an IR transmission link, LED sequence (energize/deenergize) information to an IR receiver 150 disposed on or proximate the rotating platter 142. The IR receiver 150 relays the transmitted LED display control information to the LEDs 146 disposed upon the assembly 144. In this manner, the non-contact type IR data transmission system eliminates a bouncing error that exists in systems utilizing physical contacts to effect data transmission where relatively high rotational speeds (e.g., 2,200 revolutions per minute) are encountered.

In other embodiments, the IR receiver 150 is disposed elsewhere within the display device 103. For example, in one embodiment of the invention, the IR receiver 150 is located in one of the mounting devices 144 (e.g., mounting device 144A). In addition, weight of the IR receiver 150 is considered when positioning the IR receiver 150 on mounting device 144A so that the IR receiver 150 acts as a counter-balance to the weight of the LEDs 146 in the vertical assembly 144B.

In one embodiment of the invention, an infrared signal generated by the IR transmitter 152 comprises a frequency shift keying (FSK) modulated signal where a "0" comprises a carrier signal modulated at about 38 KHz, and a "1" comprises a carrier signal modulated at, illustratively, another frequency or where no carrier signal is provided. Given these illustrative constraints, the transmitted data speed is about 1,000 bits per second. For example, one bit may be transferred each time the IR receiver 150 passes within the view of the IR transmitter 152.

In another embodiment, command frames are sent in variable bit lengths from a fixed control board (e.g., controller 130) to a revolving control board (e.g., IR receiver 150) disposed upon the platter 142. Thus, the application level of software can send different message information from the fixed part (i.e., the IR transmitter 152) to the revolving part (i.e., the IR receiver 150) without stopping the rotation of the platter 142.

Figure 2:
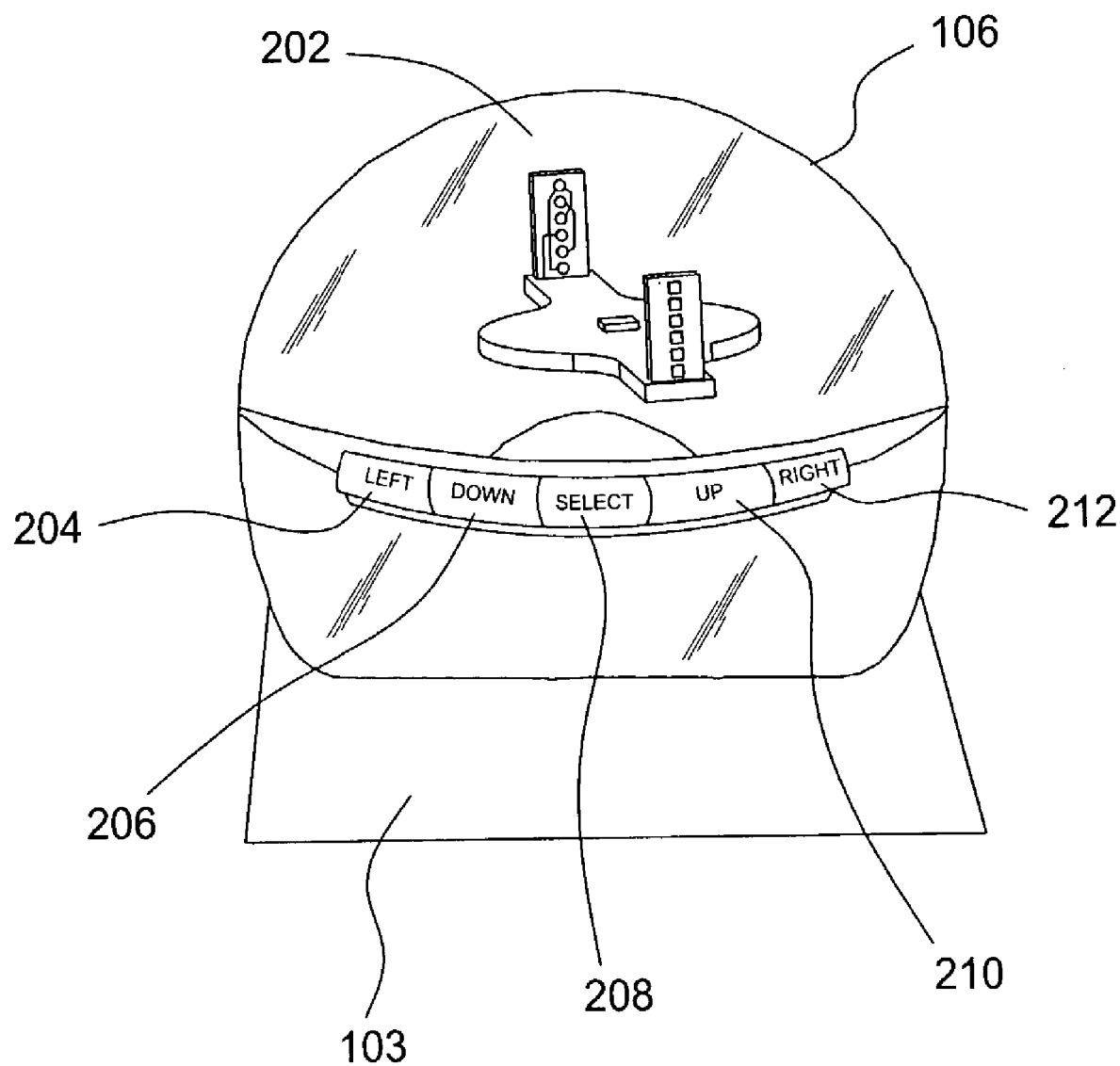
FIG. 2 depicts a perspective view of an exemplary display device suitable for use with the apparatus of FIG. 1.

FIG. 2 depicts a perspective view of a display device according to an embodiment of the invention. The display device 103 of FIG. 2 is shown in operation wherein a message is displayed via seven vertically mounted LEDs 146 within the display device 103. Each message to be displayed comprises a plurality of virtual characters 202. Specifically, rotating member 142 is rotating at an appropriate speed (e.g., 2,200 rpm). The IR transmitter 152 has transmitted an infrared signal (e.g., CID information received and interpreted from PSTN 101) to IR receiver 150. In response, the IR receiver 150 provided energize/de-energize instructions to a plurality of LEDs 146. The sequential energizing/de-energizing LEDs 146 produces the virtual characters 202. These virtual characters 202 are visible through the substantially translucent cover 106.

The display device 103 of FIG. 2 includes a user interface (e.g., a plurality of control buttons; illustratively, a "LEFT," "DOWN," "SELECT," "UP," and "RIGHT" buttons, 204, 206, 208, 210, and 212, respectively). The illustrative buttons allow user entry of messages for subsequent display and/or transmission. For example, the LEFT and RIGHT buttons, 204 and 212 respectively, may be used to navigate between the virtual characters. The SELECT button 208 may be used to select a navigated-to virtual character to be modified. The DOWN and UP buttons, 206 and 210 respectively, may be used to traverse a list of characters capable of being displayed, which displayed character is selected for display (arid optional transmission) upon activation of the SELECT button 208. Thus, in operation, a user seeking to enter a message into the display device 103 manipulates the LEFT and/or RIGHT buttons, 204 and 212 respectively, until a desired virtual character is highlighted, which character is then selected for change by activating the SELECT button 208. The user then manipulates the UP button 210 and/or DOWN button 206, until a desired character to be displayed as a virtual character is provided, which provided character is then selected for use as the virtual character by user activation of the SELECT button 208.

The controller 130 causes the motor 120 to drive the rotation rod 125. The rotation rod 125 interacts with a rotating member 142 (e.g., a platter) causing the platter 142 to rotate synchronously with the rotation of the rotation rod 125. When the telephone processing circuit 110 receives a signal (e.g., a telephone call) from a communications network (e.g., PSTN 101), the telephone processing circuit 110 transmits the telephone call to telephone 102 and to controller 130. Upon receipt of the telephone signal, the components within the controller 130 interpret the telephone call and cause the energization/de-energization of LEDs 146.

Figure 3:
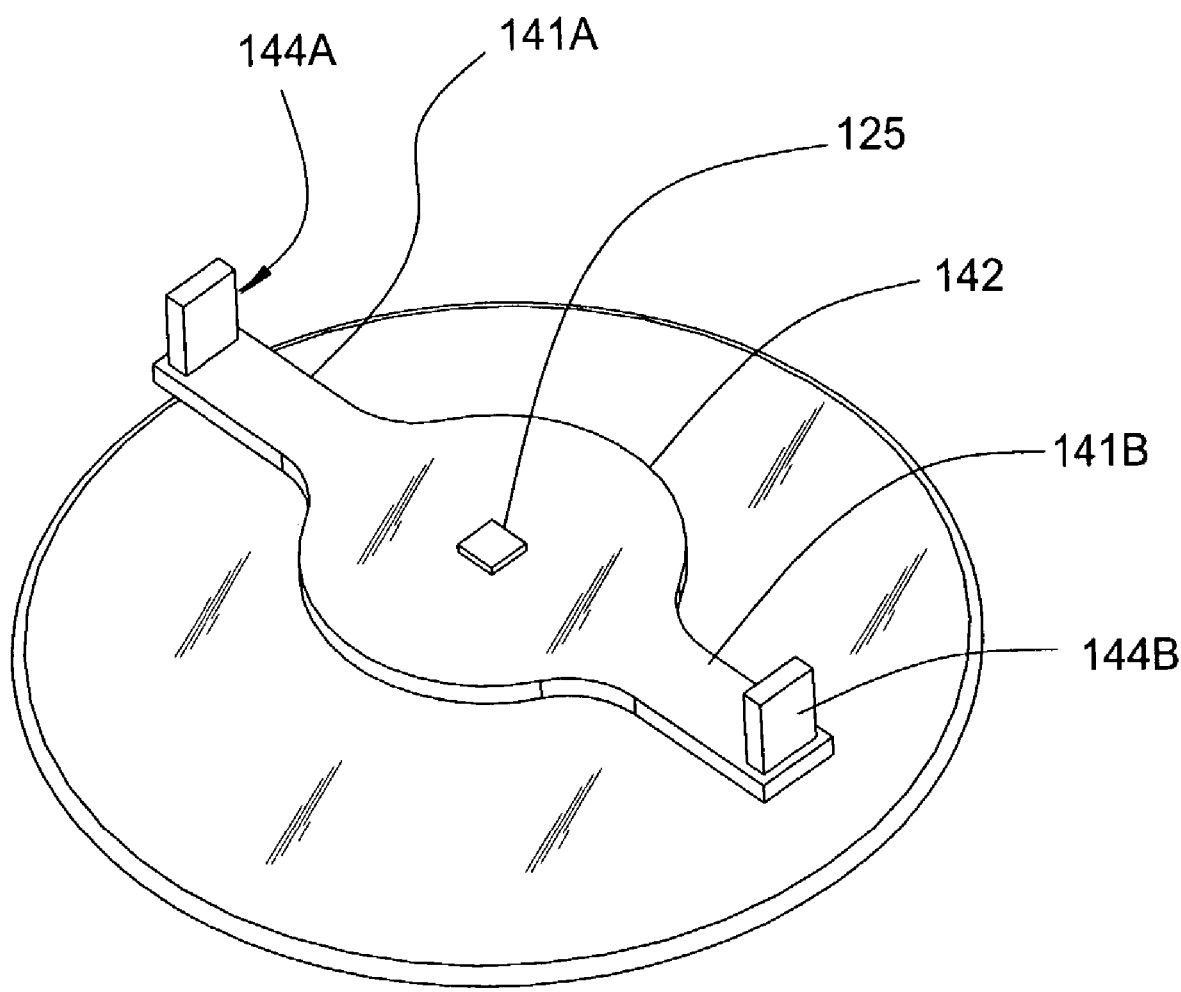
FIG. 3 depicts a top perspective view of a portion of the exemplary display device shown in FIG. 2.

FIG. 3 depicts a top view of the display device of FIG. 2 with the substantially translucent cover 106 removed. Specifically, FIG. 3 depicts the platter 142, the rotating shaft 125, the two elongated sections 141A and 141B, and the two mounting assemblies 144A and 144B. In addition, a row of LEDs 146 (e.g., illustratively, seven vertically disposed LEDs 146) is visible on each of the first and second substantially vertical mounting devices, 144A and 144B, respectively. Although FIG. 3 depicts the first and second substantially vertical mounting devices, 144A and 144B respectively as each having LEDs 146 mounted thereto, a person of ordinary skill in the art will appreciate that only one of the substantially vertical mounting devices (either 144A or 144B) may be used to practice the invention.

Figure 4:
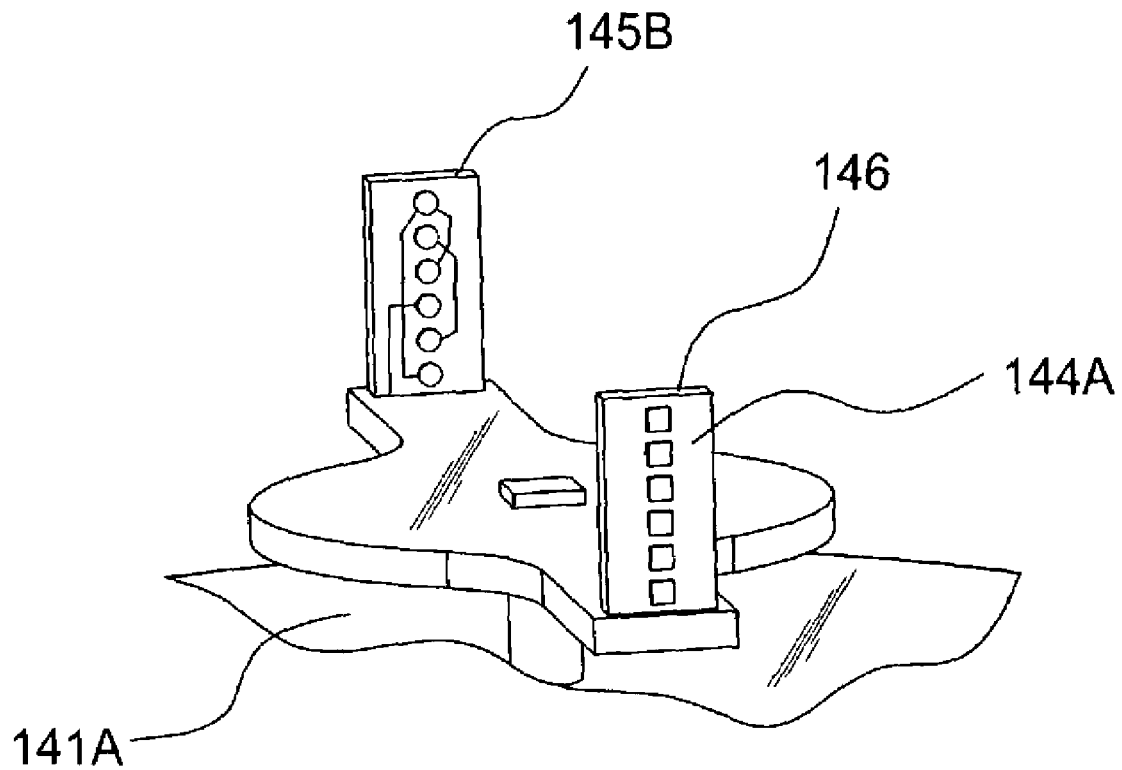
FIG. 4 depicts an orthogonal view of an embodiment of an LED array suitable for use with the invention.

FIG. 4 depicts an orthogonal view of an LED assembly suitable for use in the display device of FIG. 2. In the foreground of FIG. 4, a plurality of vertically disposed LEDs 146 (illustratively eight) is depicted. More or fewer LCDs (or other illumination sources) may be used.

Figure 5:
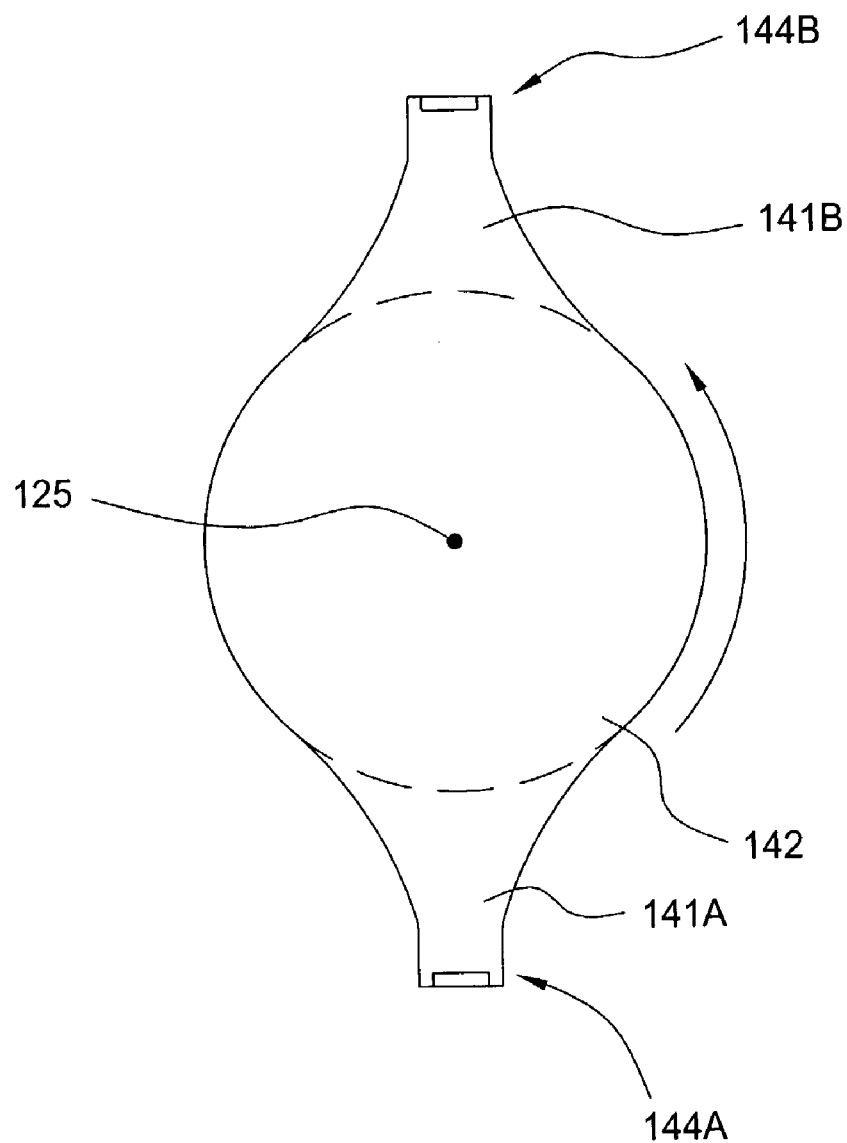
FIG. 5 depicts a top view of a rotatable assembly suitable for use with the invention.
Figure 7:
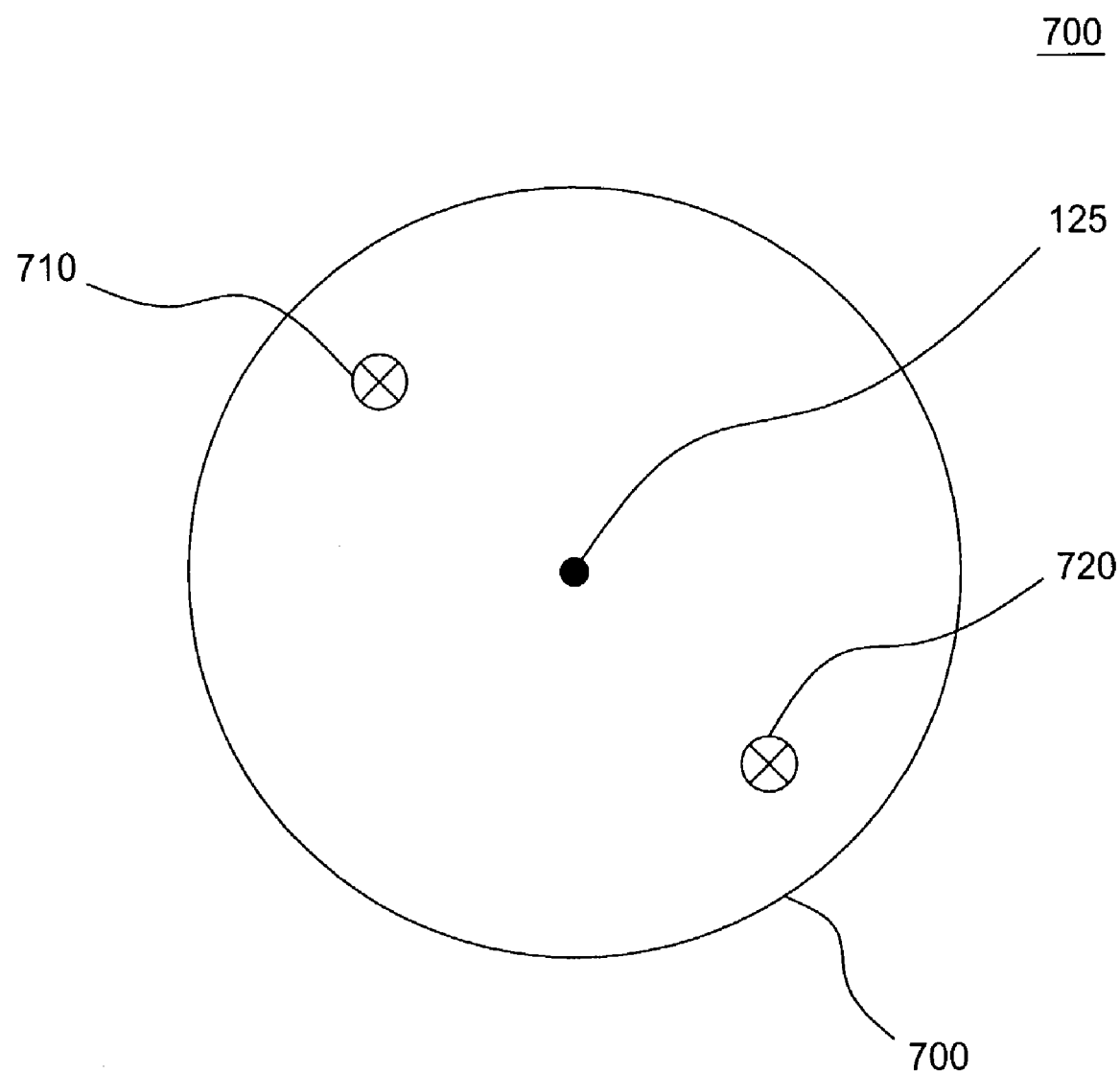
FIG. 7 depicts a top view of a stationary assembly suitable for use with the display device depicted in FIG. 1.

FIG. 5 depicts a top view of yet another embodiment of a rotating assembly 140 showing a platter 142 having two opposed elongated sections 141A and 141B. Each of the opposed elongated sections 141A and 141B includes a respective LED carrier 144A and 144B. FIG. 7 also depicts rotational rod 125 interacting with platter 142 and causing the platter 142 to rotate synchronously with the rotational rod 125.

Although FIG. 5 is described as having LEDs disposed on each of the elongated sections 141A and 141B, it is noted that in other embodiments of the invention only a single LED carrier is used. For example, in an embodiment having an LED carrier disposed on elongated section 141A, the non-LED carrier section, elongated section 141B is weight adapted to counteract the weight of the used LED carrier on elongated section 141A. Also, as previously noted, the non-LED carrier section 144B/141B may be eliminated entirely, or reduced to a smaller section sufficiently weighted to counterbalance LED section 141A/144A.

Figure 6:
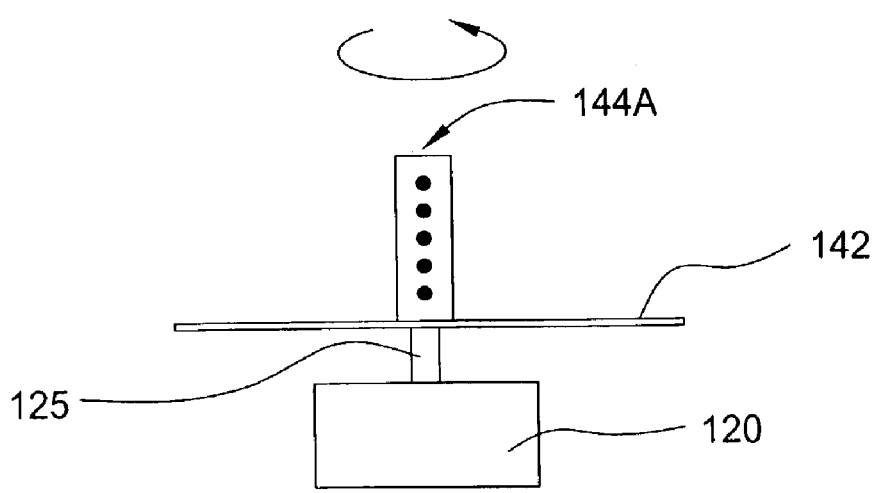
FIG. 6 depicts a side view of the rotatable assembly depicted in FIG. 5.

FIG. 6 depicts a side view of the rotating assembly 140. Specifically, FIG. 6 depicts motor 120, rotational rod 125, platter 142A, and substantially vertical mounting device 144A having a row of LEDs 146 disposed thereon.

The rotational rod 125 interacts with both the motor and the platter 142. As the motor's 125 actuation of the rotational rod 125 also causes the platter 142 to rotate. Although FIG. 6 depicts one row of LEDs 146, it will be appreciated by those skilled in the art that multiple rows of LEDs 146 may be provided on one carrier and/or on both carriers.

FIG. 7 depicts a top view of a stationary assembly 700 suitable for use in the display device 103 of FIG. 1. Specifically, the stationary assembly 700 of FIG. 7 is disposed in a co-planar manner (preferably below) with respect to the platter 142 of the rotating assembly 140. The stationary assembly 700 is axially aligned via the center or pivot portion 125, as shown in FIG. 7. A first infrared (IR) LED 710 is disposed on the stationary assembly 700 at approximately mid-radius (though it may be anywhere). This first LED 710 comprises a relatively wide beam angle LED (or standard LED having an unobstructed beam path). The first LED is used to transfer data to the infrared receiver 150. A second LED 720, illustratively a low beam angle LED (or standard LED having disposed about it an optical inhibiting or aiming structure such as a cylinder) is disposed near the edge of the stationary assembly 700. The low beam angle LED 720 is used to provide an IR signal that is detected and a resulting pulse train is used in a control loop to maintain the speed of the rotating assembly 140. For example, in one embodiment, the rotating assembly has a fixed rotational speed of 2,200 revolutions per minute. As such, an IR detector that optically cooperates with the low beam angle LED 720 once each revolution will produce 2,200 pulses per minute. If the number of pulses is greater than 2,200, then the controller 130 causes the LEDs 146 to blink faster. If the number of pulses is less than 2,200, then the controller 130 causes the LEDs 146 to blink slower.

In one embodiment, each of the LEDs 710, 720 are associated with a respective receiver. In an alternate embodiment, a single IR receiver/transmitter pair is used to provide both control and data transfer functions.

Figure 8:
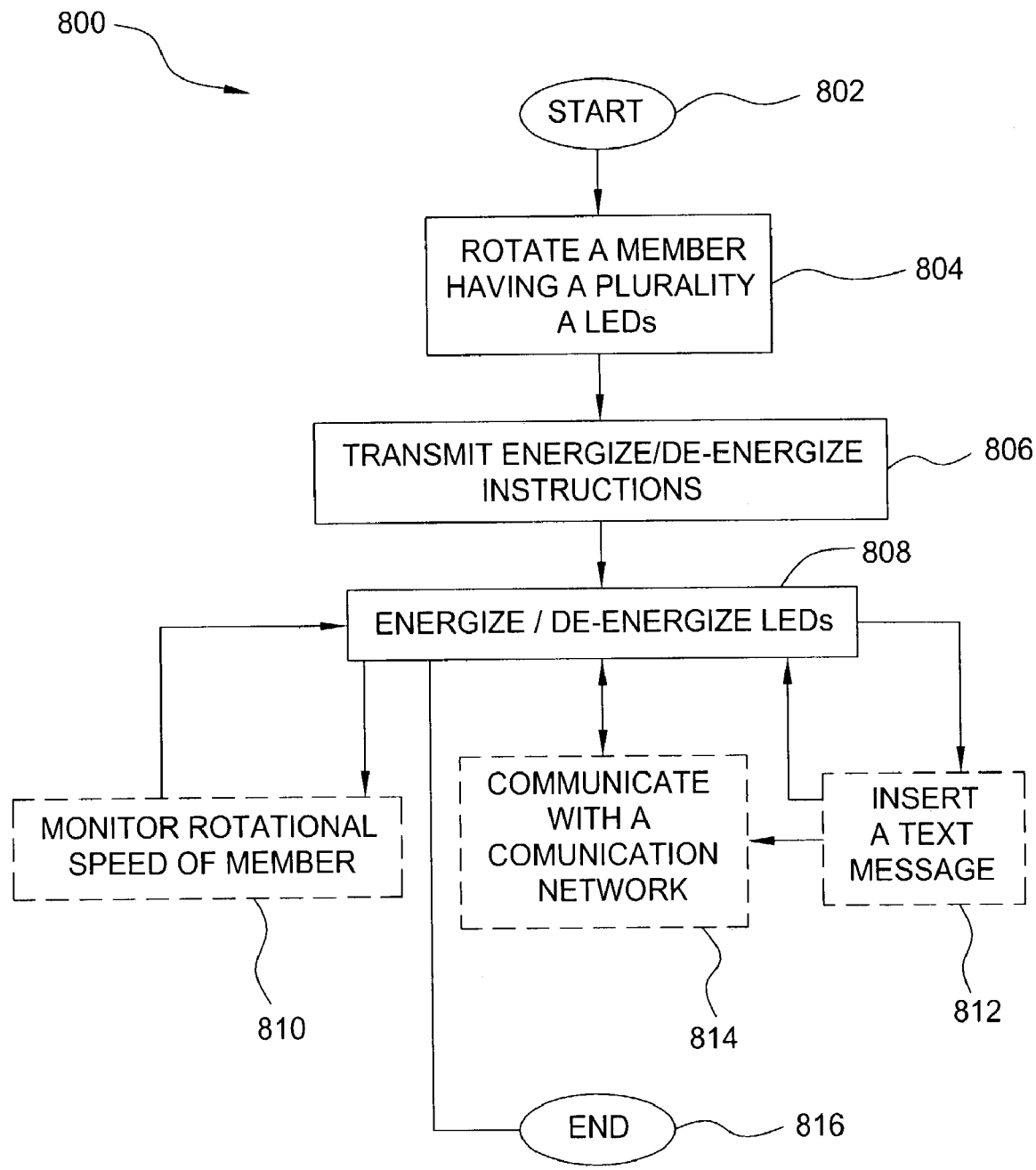
FIG. 8 depicts a block diagram of an embodiment of a method used in accordance with the invention.

FIG. 8 depicts a block diagram of an embodiment of a method 800 used in accordance with the invention. The method 800 begins at step 802 with the rotation, at step 804, of a member 142 at about 2,200 ppm. The rotating member has a plurality of LEDs 146 disposed thereon.

At step 806, the IRT 152 receives instructions (e.g., from the input/output circuit 132) and in response thereto transmits the instructions, via an infrared signal, to IRR 150. Upon receipt of the instructions from the IRT 152, the IRR 150 instructs the LEDs 146 to energize/de-energize accordingly.

At step 810, the controller 130 monitors the rotational speed of the rotating member 142. If the rotational speed (i.e., pulses per minute) is faster than the exemplary rotational speed (e.g., 2,200 ppm), the IRT 152, within controller 130, cause the LEDs 146 to blink faster. If the rotational speed of the rotating member 142 is slower than the rotational speed, then the controller 130 causes the LEDs to blink slower. The method ends at step 816.

FIG. 8 optionally includes steps 814 and 812. Specifically, at step 812, a user can, if desired, utilize a user interface to insert text messages. The user interface may illustratively be a keypad 162 or buttons 204, 206, 208, 208, 210, and 212. However, the illustrative user interfaces are not intended in any way to limit the invention. A person skilled in the art will appreciate that other user interfaces may be used for the insertion of text messages into the device 103. After insertion of the text message, the controller 130 causes the LEDs to display the inserted message and to blink at the appropriate rate.

At step 814, a user receives communication signals from a communications network 101 for display by device 103. These communication signals may take various forms (e.g., a CID, an SMS message, or an e-mail). In addition, a user may, at step 814, optionally transmit information towards the communication network 101 (e.g., a PSTN) via the insertion of text messages. The user may also communicate through the communications network 101 to a server 109 and/or a short message service center 107.

In one embodiment, controller 130 contains a keyboard interface 160 that allows a user, via a keyboard 162, to input text messages for display and optional transmission through the communications network 101 towards a server. For example, a user may send and/or edit an e-mail by typing/selecting the appropriate command and types a desired message. The LEDs 146 energize/de-energize to display the command and desired message. The processor 136 and other programs 145 interpret the command and transmit the desired message towards an appropriate recipient, via the communications network 101.

In other embodiments, the communications network 101 includes an optional short message service center (SMSC) 103. A user, upon proper subscription to an SMSC subscription provider receives and initiates SMS messages. In these embodiments, the display device 130 is adapted to send and receive a short message service signal (SMS) towards the SMSC 107. Specifically, the SMSC 107 may receive an SMS message (e.g., from a mobile phone, fax machine and/or IP address) and forward the message via the communications network 101 toward the display device 103. In this embodiment, the telephone processing circuit 110 and controller 130 are adapted to interpret and display the SMS message. In addition, a user may use control buttons; illustratively, the "LEFT," "DOWN," "SELECT," "UP," and "RIGHT" buttons, 204, 206, 208, 210, and 212, respectively and/or keypad 162 to edit and/or write SMS messages. The user may subsequent transmit the SMS message towards the SMSC 107. In one embodiment of the invention, the device 103 operates under the ES 201 912 standard set forth by the European Telecommunications Standard Institute (ETSI).

In yet other embodiments, the communications network 101 includes a server 109. A user, upon having access to the server 109 and any additional subscription services may send and receive e-mail messages. In these embodiments, the display device 103 transmits and receives e-mail messages towards/from the server 109. Specifically, the telephone processing circuit 110 and the controller 130 of display device 130 are adapted to recognize and interpret an e-mail header (e.g., an e-mail address). Both the e-mail header and a body of the message accompanying the e-mail header are displayed. A user may utilize the keypad 162 or the control buttons control buttons; 204, 206, 208, 210, and 212 to edit, write, and transmit e-mail messages. In addition, the memory 138 of display device 130 contains an "in box" and an "out box" and sufficient address locations to store the received and sent e-mail messages within the respective in box and out box.

Although the invention has been described with respect to a stand-alone unit, that description is not intended to limit the invention in any way. Specifically, various embodiments of the invention exist which may include use with analog and digital phones. Additional embodiments exist in which a user may edit a telephone number list stored either in the phone's memory or memory within the display device. In another embodiment, the display device is part of the phone.

In other embodiments, the invention is part of the base station and used with corded and cordless telephones (e.g., analog and digital 900 MHz, 2.4 GHz, and 5.8 GHz systems). A user can make a call or receive the call through one of the remote handsets or through the base station directly.

Although various embodiments that incorporate the teachings of the present invention have been described herein, those skilled in the art can readily devise many other varied embodiments that still incorporate these teachings.

What is claimed is:

1. Apparatus comprising:
    a rotatable member having a display end upon which a plurality of light emitting devices (LEDs) are disposed in a linear manner normal to a plane of rotation;
    an infrared transmitter (IRT), for communicating energize instructions conforming to a message to be presented; and
    an infrared receiver (IRR), for receiving said energize instructions and responsively energizing specific light emitting devices such that said message is presented by said rotating light emitting devices;
    said IRR being disposed upon said rotatable member in a manner tending to counterbalance said plurality of LEDs.

2. The apparatus of claim 1 further comprising a user interface for communicating user instructions to a controller, said controller providing corresponding energize instructions to said IRT.

3. The apparatus of claim 2 wherein said user interface comprises a key pad interface.

4. The apparatus of claim 2 wherein said user interface comprises at least one button on said apparatus.

5. The apparatus of claim 1 further comprising a substantially translucent barrier for allowing visual perception of said LEDs when said LEDs are energized.

6. The apparatus of claim 1 wherein:
    said rotatable member comprises an underside portion having attached thereto said IRR for receiving said energize instructions and a second IRT, for providing a rotation rate indicium to said motor controller, wherein said motor controller responsively adapts a rotation speed.

7. The apparatus of claim 1 further comprising a battery within said apparatus for supplying power to said apparatus.

8. The apparatus of claim 1 further comprising a processing circuit for communicating with a communications network.

9. The apparatus of claim 1 further comprising a processing circuit for communicating with a short message service center (SMSC).

10. The apparatus of claim 1 further comprising a processing circuit for communicating with a server.

11. The apparatus of claim 1 wherein said apparatus is part of a telephone.

12. The apparatus of claim 11 wherein said telephone has a cordless headset.

13. A system comprising:
    a communications network; and
    an apparatus adapted to receive, edit and send signals from and towards said communications network wherein said apparatus comprises a rotatable member having a display end upon which a plurality of light emitting devices (LEDs) are disposed in a linear manner normal to a plane of rotation;
    an infrared transmitter (IRT), for communicating energize instructions conforming to a message to be presented; and
    an infrared receiver (IRR), for receiving said energize instructions and responsively energizing specific light emitting devices such that said message is presented by said rotating light emitting devices;
    said IRR being disposed upon said rotatable member in a manner tending to counterbalance said plurality of LEDs.

14. The system of claim 13 wherein said signals are from a short message service center.

15. The system of claim 13 wherein said signals are e-mail messages.

* * * * *